(12) United States Patent
Bigley

(10) Patent No.: US 6,170,628 B1
(45) Date of Patent: *Jan. 9, 2001

(54) VEHICLE DRIVE TRAIN

(75) Inventor: Jon A. Bigley, Bowling Green, KY (US)

(73) Assignee: Warn Industries, Inc., Milwaukie, OR (US)

(*) Notice: Under 35 U.S.C. 154(b), the term of this patent shall be extended for 0 days.

This patent is subject to a terminal disclaimer.

(21) Appl. No.: 09/552,848

(22) Filed: Apr. 20, 2000

Related U.S. Application Data

(63) Continuation of application No. 08/953,278, filed on Oct. 17, 1997, now Pat. No. 6,109,411, which is a continuation-in-part of application No. 08/651,384, filed on May 22, 1996, now Pat. No. 5,740,895.

(51) Int. Cl.[7] .............................. B60K 23/08; F16D 11/08
(52) U.S. Cl. .................................. 192/69.41; 192/69.42; 301/105.1; 180/247
(58) Field of Search ............................ 192/69.41, 69.42, 192/69.9; 301/105.1; 180/247

(56) References Cited

U.S. PATENT DOCUMENTS

| | | |
|---|---|---|
| 2,978,276 | 4/1961 | Huffman . |
| 3,718,213 | 2/1973 | Hegar . |
| 4,116,320 | 9/1978 | Quillam . |
| 4,213,514 | 7/1980 | Ehringer .............................. 180/308 |
| 4,273,460 | 6/1981 | Ueno . |
| 4,282,949 * | 8/1981 | Kopich et al. ................. 192/69.41 X |
| 4,441,597 | 4/1984 | Teraoka . |
| 4,561,520 | 12/1985 | Fogelberg . |
| 4,627,512 | 12/1986 | Clohessy . |
| 4,692,049 | 9/1987 | Engle . |
| 4,775,040 | 10/1988 | Telford . |
| 4,817,752 * | 4/1989 | Lobo et al. ........................... 180/247 |
| 4,893,960 | 1/1990 | Beier . |
| 4,960,192 | 10/1990 | Kurihara . |
| 5,044,479 * | 9/1991 | Petrak ..................................... 192/49 |
| 5,141,088 | 8/1992 | Kurihara . |
| 5,353,890 | 10/1994 | Clohessy . |
| 5,394,967 | 3/1995 | Bigley ................................ 192/69.4 |
| 5,702,162 | 12/1997 | Pressler ........................... 180/247 X |
| 5,740,895 | 4/1998 | Bigley ............................... 192/69.41 |
| 5,984,422 * | 11/1999 | Seifert ........................... 192/69.41 X |

* cited by examiner

Primary Examiner—Richard M. Lorence
(74) Attorney, Agent, or Firm—Robert L. Harrington

(57) ABSTRACT

An automatic clutch for a vehicle drive train to selectively connect and disconnect a drive portion of the drive train to a driven portion of the drive train, the drive and driven portions having adjacent and mated spline portions at a designated position in the drive train. A clutch ring slidably mounted to one of the spline portions and slidable into engagement with the other spline portions. The designated position adjacent a portion of the vehicle frame and a remote controlled actuator secured to the portion of the vehicle frame. A bearing member of the actuator engaging the clutch ring for urging sliding movement of the clutch ring. Improvements to the above include application of the actuator clutch to front and rear wheel ends for conversion of the vehicle between two-wheel and four-wheel drive, the actuator being mounted to the steering knuckles. Also, improved bearing packs are provided for better performance and to facilitate assembly.

2 Claims, 9 Drawing Sheets

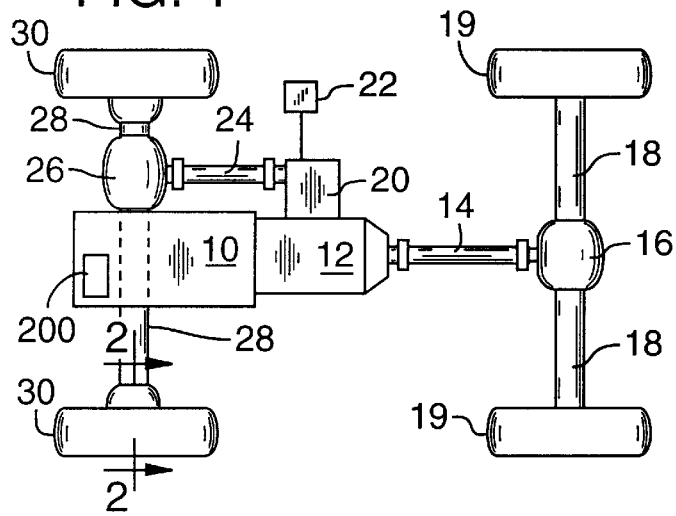
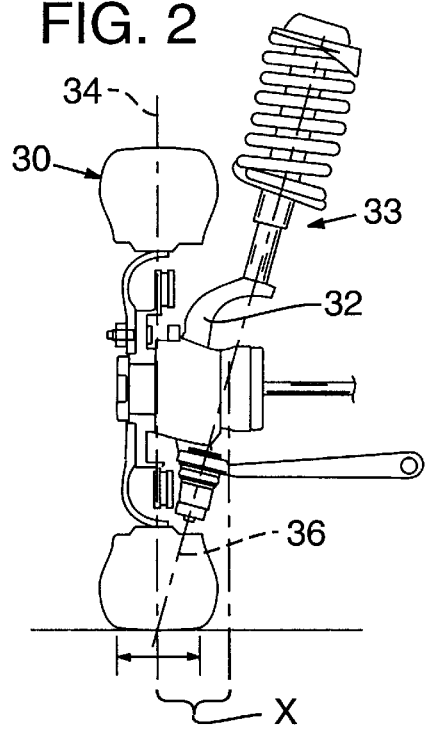
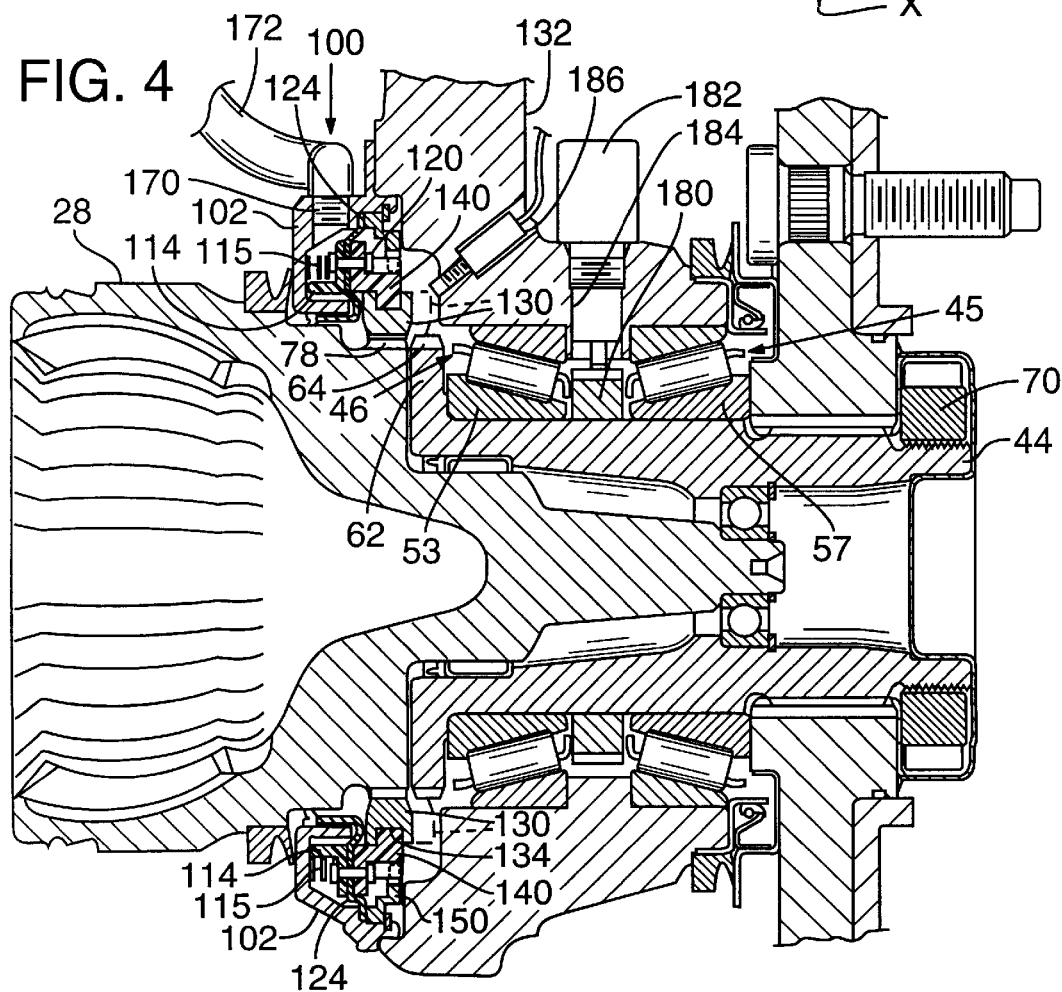

VEHICLE DRIVE TRAIN

This application is a continuation of application Ser. No. 08/953,278 filed on Oct. 17, 1997 now U.S. Pat. No. 6,109,411 which is a continuation-in-part of application Ser. No. 08/651,384 filed May 22, 1996 now U.S. Pat. No. 5,740,895.

FIELD OF THE INVENTION

This invention relates to transfer of torque between components of a vehicle drive line (sometimes referred to as a drive train) exemplified by the automated engagement/disengagement of a wheel to a vehicle's drive line.

BACKGROUND OF THE INVENTION

A common drive system for certain types of vehicles includes the ability to shift from two-wheel drive to four-wheel drive. Either the front wheels or the back wheels are permanently engaged with the vehicle's drive train and the remaining set of wheels is shifted into and out of engagement with the drive train. For purposes of discussion, the rear wheels will hereafter be considered permanently engaged with the drive train and the front wheels are in part-time engagement, but the reader will appreciate that the invention is equally applicable to the front wheels being permanently engaged with a drive train and the rear wheels in part-time engagement.

Whereas a drive train will include a transmission that transmits drive power from the vehicle's engine to a propeller shaft that extends to the differential and then the wheel axles, e.g, of the rear wheels, in order to provide four-wheel drive, there is a further propeller shaft that extends forward to the differential of the front wheels, e.g., via a transfer case that also receives drive power from the transmission. A shift mechanism in the transfer case engages and disengages the drive power to the propeller shaft for the front wheels.

In the disengaged position, the front wheels are not being driven but then the passive turning of the front wheels drives the front wheel axles and front wheel propeller shaft unless there is also a disconnect mechanism between each front wheel and its axle. It is the disconnect mechanism between the wheel and axle to which the present invention is primarily directed although those skilled in the art will appreciate the further application of the invention, e.g., to other components of the drive train.

Returning to the front wheel connect/disconnect mechanism, historically this mechanism was located in the wheel hub and advanced from manual to automatic operation. The structural arrangement included a cylindrically configured spindle which was fixedly mounted to the vehicle chassis, i.e., on the steering knuckle. The axle protruded through the center of the spindle and a wheel hub was mounted on the exterior of the spindle and surrounding the axle. Each of the wheel hub and axle was independently rotatable relative to the spindle and a clutch mechanism at the outboard end of the spindle produced the desired connect/disconnect of the wheel hub to the axle. A later version referred to as a live spindle provided for the spindle to be rotatably mounted to the vehicle chassis and the wheel hub was fixedly mounted to the spindle. The axle as before was protruded through the spindle and a clutch mechanism at the outboard end of the spindle produced the connect/disconnect operation.

BRIEF DESCRIPTION OF THE PRESENT INVENTION

In the ongoing development of clutch mechanism and particularly as related to automatically actuated clutch mechanism, several factors remained a concern. The material of the various clutch components being extended to the outboard end of the spindle added weight and enlarged the king pin radius, both of which are undesirable. Also, the components had to be packaged to fit within the confined space of the wheel hub interior and as concerns the live spindle version, all of the components for automatic actuation of a clutch mechanism had to be mounted on a rotating member, i.e., the rotating wheel hub, the rotating spindle or the rotating axle. Whereas hydraulic and pneumatic automatic actuating devices were developed, such relied on creating a sealed chamber as between two relatively rotating components and such chambers were subject to undesired leakage.

The present invention obviates much or all of these deficiencies by the strategic placement of the clutch mechanism at the inboard end of the spindle. In the preferred embodiment, the axle and spindle are cooperatively configured to provide mated and adjacent spline portions at circumferentially exterior locations adjacent to a non-rotating portion of the chassis, e.g., the knuckle. The automatic actuation mechanism is fixedly mounted to the knuckle and the rotating clutch ring is axially displaced through a bearing interface between the actuator and the clutch ring.

Whereas the above substantially describes the structure of parent U.S. patent application Ser. No. 08/651,384 referred to above, a number of improvements are herein additionally disclosed. The structure as described above readily adapts to other drive train types, e.g., wherein the front wheels are permanently engaged with the front axles in full time four-wheel drive, and wherein the front wheels are permanently disengaged from the drive train in two-wheel drive only. Thus, widely varying wheel end designs for different drive train types can be avoided. A further improvement includes multiple sensors to provide feed back for ABS braking as well as other sensing needs, e.g., determining whether the clutch is engaged or disengaged. The reduced mechanism between the knuckle and wheel hub (outboard of the clutch mechanism) allows a shorter distance between the load center of the wheel hub (tire) and the king pin axis and a reduced mass for the axle end (resulting in weight reduction). The allowable increased circumference of the clutch ring and thus a greater number of splines (because it is not confined to the wheel hub) enables shorter overlap of the clutch ring splines with the splines of the axle and wheel hub, again shortening the axial depth of the clutch mechanism. Also, part of the new disclosure is improved forms of bearing members (cartridge type, ball type, split bearing with one bearing half attached by fastener or press fit into the knuckle, etc.) which provides more efficient assembly of the clutch components as well as improved performance.

The above and other features, benefits and advantages will become apparent upon reference to the following detailed description and drawings referred to therein.

BRIEF DESCRIPTION OF THE DRAWINGS

FIG. 1 is a schematic view of a vehicle;

FIG. 2 is a view as viewed on view lines 2—2 of FIG. 1;

FIG. 4 is a view similar to FIG. 3 illustrating another embodiment of the automatic clutch;

DESCRIPTION OF THE PREFERRED EMBODIMENT

Figure 3:
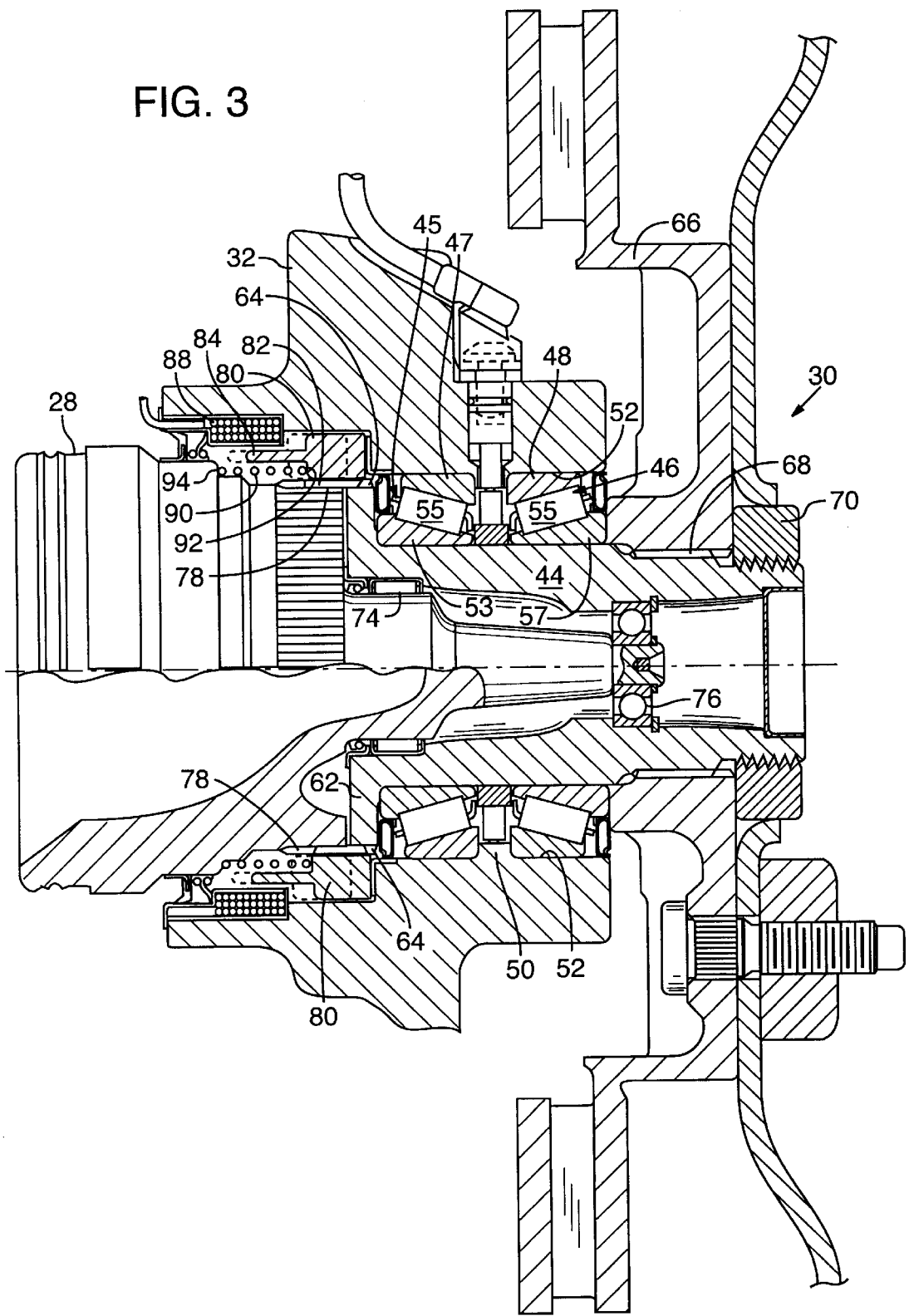
FIG. 3 is a view of an integrated wheel end incorporating an automatic clutch of the present invention.

FIG. 1 is a schematic illustration of a vehicle that may be driven either in two-wheel drive mode or four-wheel drive mode. Typically either the rear wheels are driven full time and the front wheels are engaged or disengaged from the drive train or conversely, the front wheels are driven full time and the rear wheels are engaged or disengaged from the drive train as desired. In this embodiment, the rear wheels are considered to be engaged full time with the drive train of the vehicle. A mechanism in the transfer case determines when drive power is connected or disconnected to the portion of the drive train for driving the front wheels, and clutch mechanism at the front wheels disengage the front wheels from the drive train to render the portion of the drive train between the transfer case and front wheels inactive.

Referring to FIG. 1, the vehicle has an engine 10 coupled to a transmission 12 to provide rotative power to the front and rear wheels. A propeller shaft 14 extends from the transmission 12 and is connected to a rear differential 16. Axles 18 extend laterally from the differential 16 and are coupled to rotate the rear wheels 19. The rear wheels 19 are engaged with the axles 18 in a full time mode. A transfer case 20 is coupled to the transmission 12. The transfer case 20 has shift mechanism 22 that will disengage the drive train of the transfer case 20 from the transmission 12. A front propeller shaft 24 extends from the transfer case 20 and is coupled to a front differential 26. Axles 28 extend from the front differential to the front wheels and associated mechanism referred to in general as wheel assemblies 30.

The vehicle illustrated in FIG. 1 is arranged to be driven in either two-wheel drive mode or four-wheel drive mode. The rear wheels 19 provide the propelling force in two-wheel drive mode and the rear wheels 19 in combination with the front wheels provide the propelling force in four-wheel drive mode. When driven in the two-wheel drive mode, the transfer case 20 is disconnected from the transmission 12 by the shift mechanism 22. The transmission 12 will then not provide rotative power to the front drive shaft 24 and thus the front wheel assemblies 30. The front wheel assemblies 30, however, are preferably disconnected from the front axles 28 so that the front wheels do not passively rotate the front drive train including the front axles 28, and the front propeller shaft 24. The front wheel assemblies 30 include clutch mechanisms that will selectively disconnect the wheels from the front axles 28 or connect the front wheels to the front axles 28.

Refer now to FIG. 2 of the drawings which illustrates the mounting arrangement of a front wheel assembly 30. The wheel assembly 30 is rotatably mounted on a portion of the frame structure of the vehicle referred to as a knuckle 32. The knuckle 32 is in turn pivotally mounted to suspension structure 33 of the frame of the vehicle. The knuckle 32 is arranged not only to support the wheel assembly 30 but also to provide the steering capability of the front wheels. As shown in the figure, an axis 34 is extended through the wheel assembly 30. Another axis 36, which corresponds to the pivotal axis of the knuckle 32 and is referred to as the king pin axis is extended to intersect with the axis 34. It is desirable to have the king pin axis 36 intersect the axis 34 at the road surface to provide what is referred to as a king pin radius having a zero offset. Many prior devices, due to the necessary structure of the wheel assembly and the corresponding clutch mechanisms, were such that the king pin radius was either a positive (axis 36 intersects axis 34 below the road surface) or a negative (axis 36 intersects axis 34 above the road surface) offset. The arrangement of the present integrated wheel end system provides for a zero offset king pin radius and it also provides for a shorter distance between axis 34 and the king pin axis 36 measured axially along the wheel's axis (distance X in FIG. 2).

Refer now to FIG. 3 of the drawings which illustrates one embodiment of an automatic clutch arranged to engage or disengage the axle 28 to and from a wheel spindle 44 of the wheel assembly 30. The spindle 44 is rotatably mounted in the knuckle 32 on bearings 45, 46. The outer races (cones) 47, 48 of the bearings 45, 46 are mounted in a bore 52 of the knuckle 32 in abutment against an inward protruding ring 50. A cup assembly (which includes an inner race 53 and rollers 55) of the bearing 45 is fitted on the spindle 44 with the inner race 53 in abutment with a flange end 62 of the spindle. The spindle 44 is mounted in the knuckle 32 with the rollers 55 of the inner race 53 mating the outer race 47. A cup assembly (which includes an inner race 57 and rollers 55) is mounted on the spindle with the rollers 55 of the inner race 57 mating the outer race 48. A rotor 66 is mounted on a splined end 68 of the spindle 44 and is in abutment with the inner race 57. A nut 70 threadably installed on the end of the spindle 44 secures the spindle and the rotor to the knuckle 32.

Figure 6:
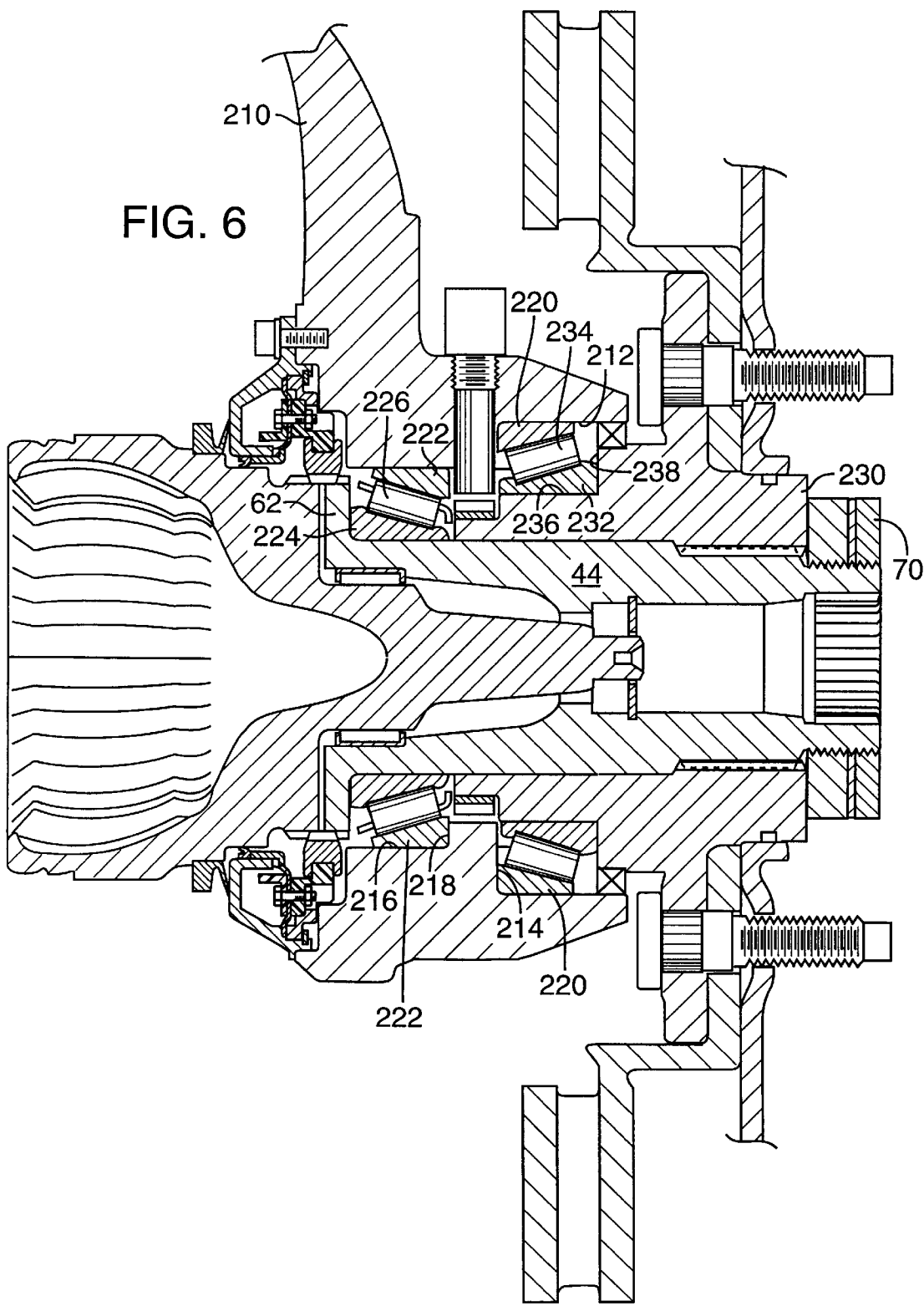
FIGS. 6, 7 and 8 are views illustrating alternate bearing mounting arrangements for the wheel spindle.
Figure 7:
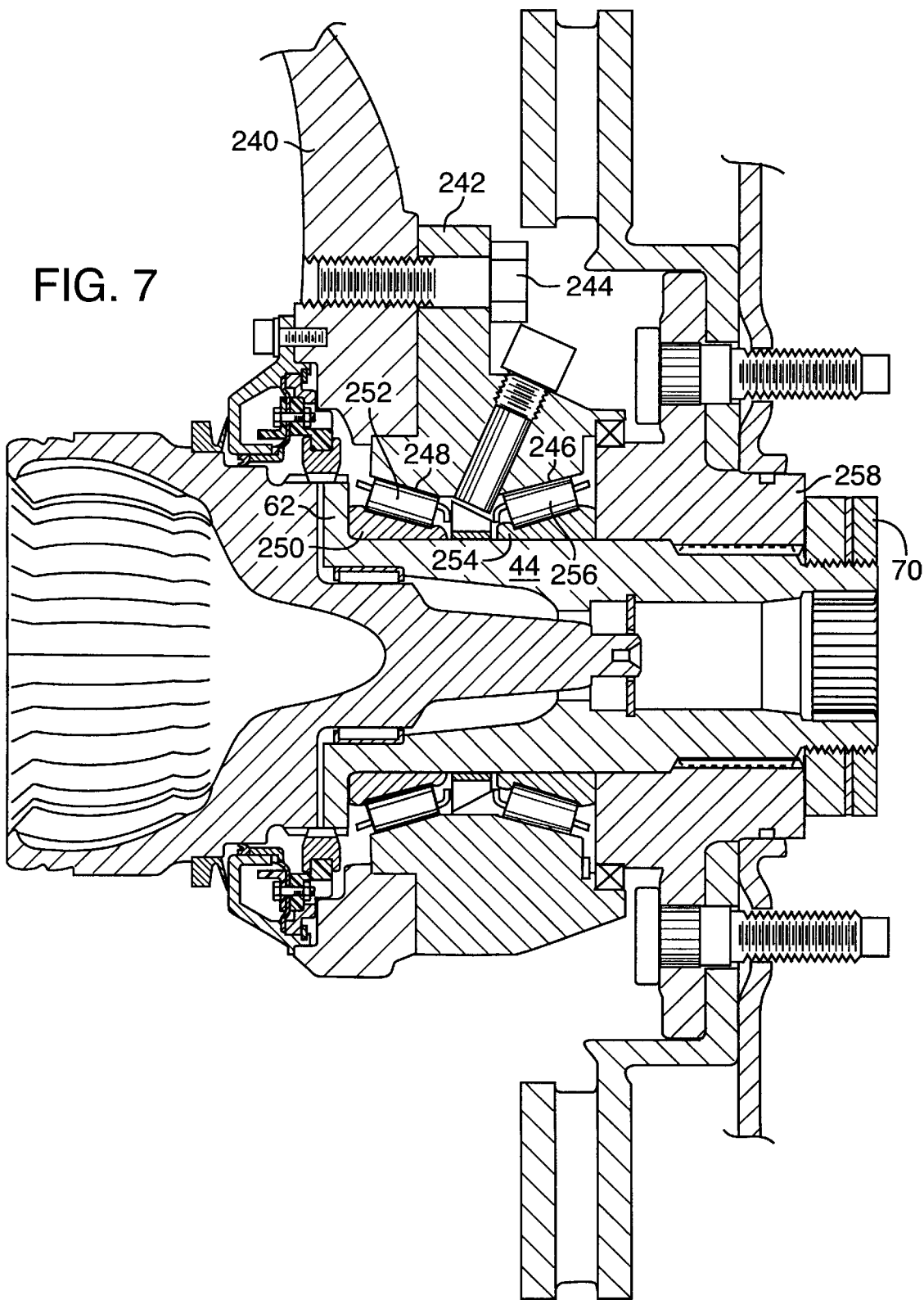
Figure 8:
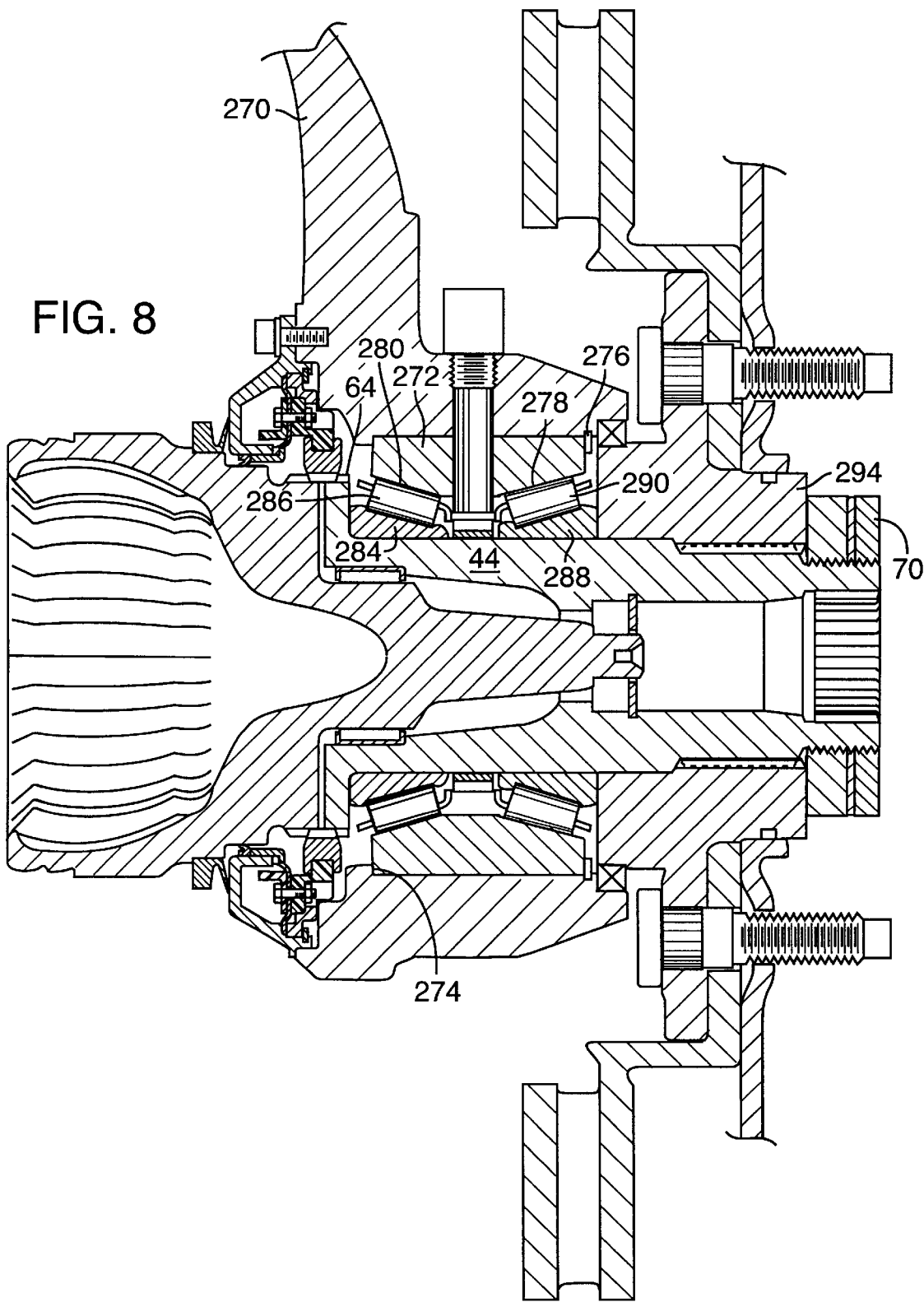

FIG. 3 illustrates the rotor 66 as being formed integral with a hub portion that mounts on the splined end 68 of the spindle 44. The rotor may have other forms such as illustrated in FIGS. 6, 7 and 8 which illustrate the rotor mounted to a separate rotor support member.

The inner flanged end 62 of the spindle 44 has gear like teeth 64 formed on its periphery. An end of the axle 28 is received in and rotatably supported in the spindle 44 on bearings 74 and 76. The axle 28, when installed, has a section adjacent the flanged end 62 of the spindle 44 that has the same diameter as the flanged end 62 and also is provided with gear-like teeth 78. The teeth 64 on the flanged end 62 and the teeth 78 on the end portion of the axle 28 are of the same type and have the same profile. A ring-like member referred to as a clutch ring 80 has teeth 82 formed on its interior surface that have the same profile and are matable with the teeth 64 of the flange end 62 and the teeth 78 of the axle end 28. The clutch ring 80 is arranged to be slidable axially along the teeth 78 of the axle end 28. The clutch ring 80 is moveable in one direction so that it is only engaged with the teeth 78 on the axle and 28 (the dash line position of FIG. 3), and is movable in the opposite direction such that the teeth 82 of the clutch ring 80 will be engaged with both teeth 78 and teeth 64 on the axle end 28 and the flange end 62, respectively (the solid line position of FIG. 3). The clutch ring 80 thus is movable to be only engaged with the axle end 28 or is movable such that it will be engaged with both the axle end 28 and the flanged end 62. The clutch ring 80 thus is movable to either disconnect the wheel assembly 30 from the drive train of the vehicle or to connect the wheel assembly to the drive train of the vehicle.

The clutch ring 80 has a flange 84 that extends axially from the main body of the clutch ring 80. A circular electro magnet 88 is mounted to the knuckle 32 in a conventional manner and is positioned strategic to the clutch ring 80. The electro magnet 88 when energized will cause the clutch ring 80 to move out of engagement with the flange end 62 of the spindle 44 (the dash line position) to only be engaged with the teeth 78 of the axle end 28. A spring 90 in abutment with a shoulder 92 on the clutch ring 80 and a shoulder 94 on the axle end 28 is provided to urge the clutch ring 80 to move into engagement with both the axle end 28 and the flange end 62 of the spindle 44 (the solid line position). The electro magnet 88 when energized provides a force sufficient to compress the spring 90 by movement of the clutch ring 80. When the electro magnet 88 is de-energized the spring 90 will force the clutch ring 80 to move toward and into engagement with the flange end 62 of the spindle 44 to thus couple the wheel assembly 30 to the axle 28 and thus to the drive train of the vehicle.

Figure 5:
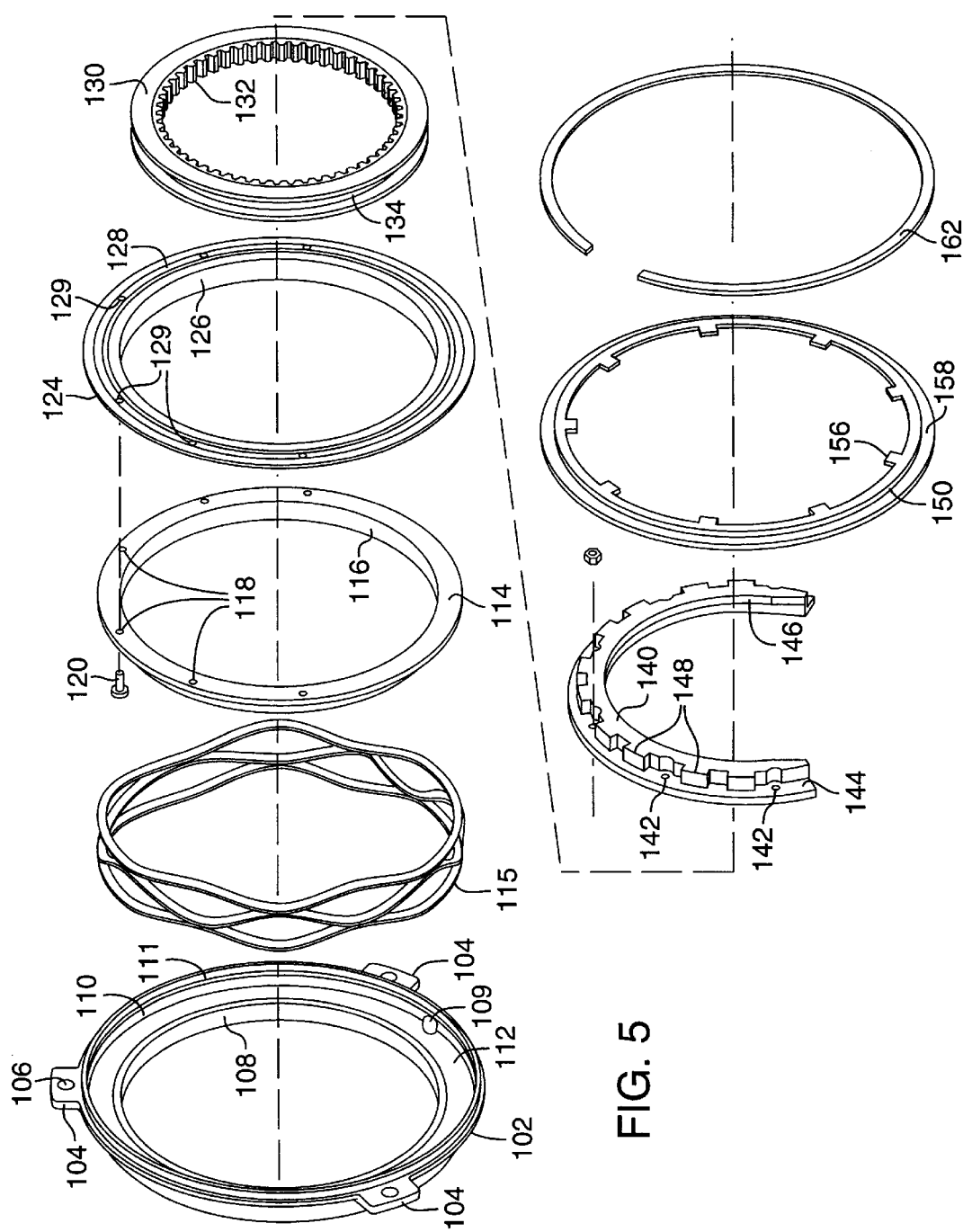
FIG. 5 is an exploded view of the automatic clutch mechanism of FIG. 4.

Refer now to FIG. 4 of the drawing which illustrates another embodiment of the automatic clutch of the present invention. A spindle 44 is rotatably mounted in a knuckle 132 as previously described. A clutch mechanism 100 is fixedly attached to the knuckle 132 and is arranged to slidably move a clutch ring 130. The clutch ring 130 is axially slidably movable in one direction to be only engaged with the axle 28 and is movable in the opposite direction to be engaged with both the axle 28 and the spindle 44. The clutch mechanism 100 is further illustrated in the exploded view of FIG. 5.

The clutch mechanism 100 has a housing 102 that is mountable to the knuckle 132. The housing 102 has extending tabs 104 to facilitate mounting the clutch mechanism to the knuckle 132. The extending tabs 104 have bores 106 to receive conventional fasteners. The housing 102 is ring-like and has a circular bore 108 formed on its interior. The inner circular bore 108 in combination with an outer side wall 110 of housing 102 forms a circular inset or groove 112. The circular groove 112 is arranged to receive a biasing spring 115 and a backup ring 114. A shoulder 111 is formed in the side wall 110 of housing 102. A tapped through bore 109 is provided in the side wall 110 to facilitate installing a fitting such as a conventional nipple connectable, e.g., to an air hose.

In this embodiment the spring 115 is of the wave type however it will be appreciated that other types may be utilized. The backup ring 114 has an axial extending flange 116 that fits in the circular groove 112. The backup ring 114 has apertures 118 to receive fasteners 120. A resilient diaphragm 124 has an axially extending flange 126 that fits snugly in the bore 108 of the housing 102. The flange 126 fitting snugly in the bore 108 will prevent any entry or exit of air from the housing 102. A radially extending flange 128 is of a diameter to fit on the shoulder 111 of the housing 102. Apertures 129, alignable with the apertures 118 in the backup ring are provided in the flange portion 128.

A circular clutch ring 130 has radially inwardly extending teeth that are matable with the teeth 78 on the end of the axle 28 and with the teeth 64 on the flange of spindle 44. The clutch ring 130 has a groove 134 formed around its periphery with the groove 134 arranged to receive a flange of a shifting fork 140.

The shifting fork 140 has apertures 142 provided in a radially extending flange 144 that are alignable with the apertures 118 in the backup ring 114 and the apertures 129 in the diaphragm 124. The shifting fork is circular in shape forming a portion of a circle that has an arc greater than 180 degrees. The shifting fork 140 is of a resilient material and thus may be flexed to fit on the clutch ring 130. The shifting fork 140 has a radially inwardly extending flange 146 that will be received in the groove 134 of the clutch ring 130 when assembled. Multiple tabs 148 are provided on the external periphery of the clutch ring 130 adjacent the flange 144.

The backup ring 114, the diaphragm 124 and the shifting fork 140 are assembled by the fasteners 120 to secure them together as a unit. The shifting fork 140 is mounted to the clutch ring 130 with the radially inward extending flange 146 being received in the groove 134 of the clutch ring 130. The clutch ring 130 is rotatable relative to the shifting fork 140.

The diaphragm 124 in this embodiment is mounted to the backup ring 114 and the shifting fork 140 by fasteners 120. It will be appreciated that the diaphragm 124 may be mounted to the backup ring 114 and to the fork 140 by other means. One method is to have snap fasteners such as detents on the diaphragm 124 that will engage the backup ring 114 and fork 140 to secure them together as an assembly.

An anti-rotation ring 150 is provided to prevent rotation of the shifting fork 140 when the unit is assembled. The ring 150 has inwardly extending tabs 156 that will be received between adjacent tabs 148 of the clutch ring 140. The ring 150 further has a radially extending circular portion 158 that fits in close proximity to the side wall 110 of the housing 102. The circular portion 158 secures the extending flange portion 128 of the diaphragm 124 against the shoulder 111. A circular snap ring 162 is provided to secure the assembly together as a unit in a conventional manner.

Referring again to FIG. 4 the automatic clutch assembly 100 is mounted to the knuckle 132. The housing 102 is secured to the knuckle 132 by conventional fasteners extending through the bores 106 and threadably installed in tapped bored holes provided in the knuckle 132. These are not shown in the drawings since they are of conventional design and are well known in the art. The axle 28 extends through the bore 108 of the housing 102 and is rotatably mounted in the spindle 44. The clutch ring 130 having teeth 133 surrounds the axle 28 and as will be explained, the clutch ring 130 is axially movable in one direction to be engaged with only the teeth 78 of the axle 28 (as shown in FIG. 4) and is movable in the opposite direction to be engaged with both the teeth 78 of the axle and the teeth 64 on the flange end 62 of the spindle 44.

A fitting, such as a nipple 170 is installed in the bore 109 and an air line 172 is attached to the nipple 170. The air line 172 is connected to an air source such as the intake manifold of the vehicle engine 10.

The housing 102 in combination with the resilient diaphragm 124 defines a chamber or cavity that may be expanded and contracted. The housing 102 is fixedly mounted to the knuckle 132 and the only part of the mechanism 100 that rotates is the clutch ring 130. This eliminates the requirement for rotary type seals. As shown, the clutch ring 130 is mounted exterior of the defined chamber.

In this embodiment air is evacuated from the defined chamber of the mechanism 100 to contract the chamber. When air is withdrawn from the chamber through the nipple 170 and air line 172 the differential air pressure will cause the diaphragm 124 and the attached backup ring 114 and shift fork 140 to move inwardly into the housing 102. The differential air pressure creates a force sufficient to compress the spring 115. This will cause the clutch ring 130 to move axially along the teeth 78 of the axle 28 in a direction away from the teeth 64 of flange end 62 of the spindle 44. When the negative air pressure is released (the pressure within the housing 102 returns to atmospheric pressure), the spring 115 urges the diaphragm 124 and attached components to move outwardly from the housing 102 causing the defined chamber to expand. This will cause the fork 140 to move the clutch ring 130 axially toward the teeth 64 of flange end 62 of the spindle 44. The clutch ring 130 will be moved into engagement with both the teeth 78 of the axle 28 and the teeth 64 of the flange end 62 of the spindle 44.

FIG. 4 shows the clutch ring 130 in solid lines moved axially by the evacuation of air to be engaged only with the teeth 78 on the axle 28. This disengages the spindle 44 from the axle 28 and thus the wheel assembly 30 is disconnected from the drive train of the vehicle. FIG. 4 shows the clutch ring 130 in dash lines moved axially by the spring 115 to be engaged with both the teeth 78 of the axle 28 and the teeth 64 of the flange end 62 of the spindle 44. This engages the spindle 44 with the axle 28 to couple the wheel assembly 30 to the drive train of the vehicle.

Whereas both the devices of FIGS. 3 and 4 are spring biased into engagement and actuated by a power source out of engagement, such can be readily reversed with the spring urging disengagement. The illustrated arrangement produces default to engagement and when reversed, produces default to disengagement. A different type of engagement mechanism is referred to as pulse actuated engagement/disengagement where there is no default position, i.e., no return spring. (See U.S. Pat. No. 5,586,632)

FIG. 4 also illustrates sensors mounted to the knuckle 132 to provide feedback information. A ring 180 is mounted on the spindle 44 between the inner races 53, 57 of the bearings 45, 46 providing rotatable support between the spindle 44 and the knuckle 132. Note that the ring 180 is spaced from the inner races 53, 57 so that the ring 180 does not interfere with the pre-load on the bearings 45, 46 established by the tightening of the nut 70. The ring 180 is of the type that will generate a signal when passed by a sensor. A sensor 182 is threadably installed in a bore 184 in the knuckle 132. The sensor 182 is positioned in close proximity to the ring 180. When the spindle 44 is rotated, the ring 180 and sensor 182 in combination will generate and send a signal to a control device 200 (FIG. 1) of the vehicle 10. The ring 180 and sensor 182 will input information on the rotation rate of the spindle 44 which is beneficial for anti-lock brakes for example.

A proximity sensor 186 is positioned strategic to the flange end 62 of the spindle 44 and is utilized to confirm that the clutch ring 130 has been moved into engagement with the teeth 64 of the spindle 44 or that the clutch ring 130 is out of engagement with the teeth 64 of the spindle 44. In an alternative arrangement, the sensor 186 can be configured to also sense the rotation rate of the flange end 62 and thus the spindle 44 for anti-lock brake purposes, thereby eliminating the need for sensor 182.

The sensor 186 may be positioned so that it will detect or sense the position of other members of the clutch mechanism 100 to determine whether or not the clutch ring 130 is engaged with the spindle 44. The sensor may, for example, be arranged to detect the position of the shift fork 140 or the diaphragm 124 or the anti-rotation ring 150.

A sensor (not shown but incorporated in the sensor 182) is of the type that will transmit the operating temperature within the knuckle 132 and may for example transmit the temperature of the bearings 45, 46.

The spindle 44 is illustrated as being rotatably mounted in the knuckle 32 and 132 in FIGS. 3 and 4 by bearings 45, 46. Other bearing arrangements may be provided to rotatably support the spindle 44 in the knuckle. Some examples are illustrated in FIGS. 6, 7 and 8.

FIG. 6 illustrates a spindle 44 rotatably mounted in a knuckle 210. The knuckle 210 has a bore 212 in which an outer race 220 is installed with the outer race 220 abutting a shoulder 214. The knuckle 210 has another bore 216 that is of a different diameter than the bore 212 and the bore 216 has a formed shoulder 218. An outer race 222 is installed in the bore 216 with the race 222 in abutment with the shoulder 218. A cup assembly which includes an inner race 224 and rollers 226 are installed on the spindle 44 with the inner race 224 in abutment with the flange end 62 of the spindle 44. A rotor support member 230 has a cup assembly including an inner race 232 and rollers 234 installed on a turned diameter 236. The turned diameter 236 terminates at a shoulder 238 and the inner race 232 is in abutment with the shoulder 238. The spindle 44 is installed in the knuckle 210 with the rollers 226 matingly engaging the outer race 222. The rotor support member 230 is installed on the spindle 44 with the rollers 234 mating with the outer race 220. A nut 70 is threadably installed on the end of the spindle 44 to secure the spindle 44 and the rotor support 230 to the knuckle 210.

FIG. 7 illustrates another bearing arrangement for rotatably supporting the spindle 44 in a knuckle 240. As shown in the figure, the knuckle 240 is arranged to receive an adapter 242. The adapter 242 is fastened to the knuckle 240 by fasteners 244. The adapter 242 includes inclined surfaces 246 and 248 that serve as outer races for the bearing set that rotatably supports the spindle 44. A cage assembly including an inner race 250 and rollers 252 are mounted on the spindle 44 with the inner race 250 being in abutment with the flange end 62 of the spindle 44. The spindle 44 is installed into the adapter 242 with the rollers 252 coming into mating contact with the outer race portion 248. Another cage assembly including an inner race 254 and rollers 256 is installed on the spindle 44 with the rollers 256 matingly engaging the outer race portion 246 of the adapter 242. A rotor support 258 is installed on the spindle with the rotor support 258 abutting the inner race 254. A nut 70 is threadably installed on the end of the spindle 44 to secure the spindle 44 to the adapter 242 and thus the knuckle 240. The flange-type cartridge bearing of FIG. 7 is illustrated with rollers. It is also suited for ball-type bearing arrangement.

FIG. 8 illustrates another bearing arrangement for supporting the spindle 44 in a knuckle 270. A combination outer race 272 is installed on the knuckle 270 with the combination race 272 being in abutment with the shoulder 274. The combination race 272 is retained on the knuckle 270 by a conventional snap ring 276. The combination race 272 has inclined flats 278 and 280 that serve as outer bearing races. A cage assembly including an inner race 284 and rollers 286 are installed on the spindle 44 with the inner race 284 being in abutment with the flange end 62 of the spindle 44. The spindle 44 is installed in the knuckle 270 and another cup assembly including an inner race 288 and rollers 290 are installed on the spindle 44 with the rollers 290 matingly engaging the outer race portion 278. A rotor support 294 is installed on the spindle with the rotor support 294 coming into contact with the inner race 288. A nut 70 threadably installed on the end of the spindle 44 secures the spindle assembly in the knuckle 270.

Figure 9:
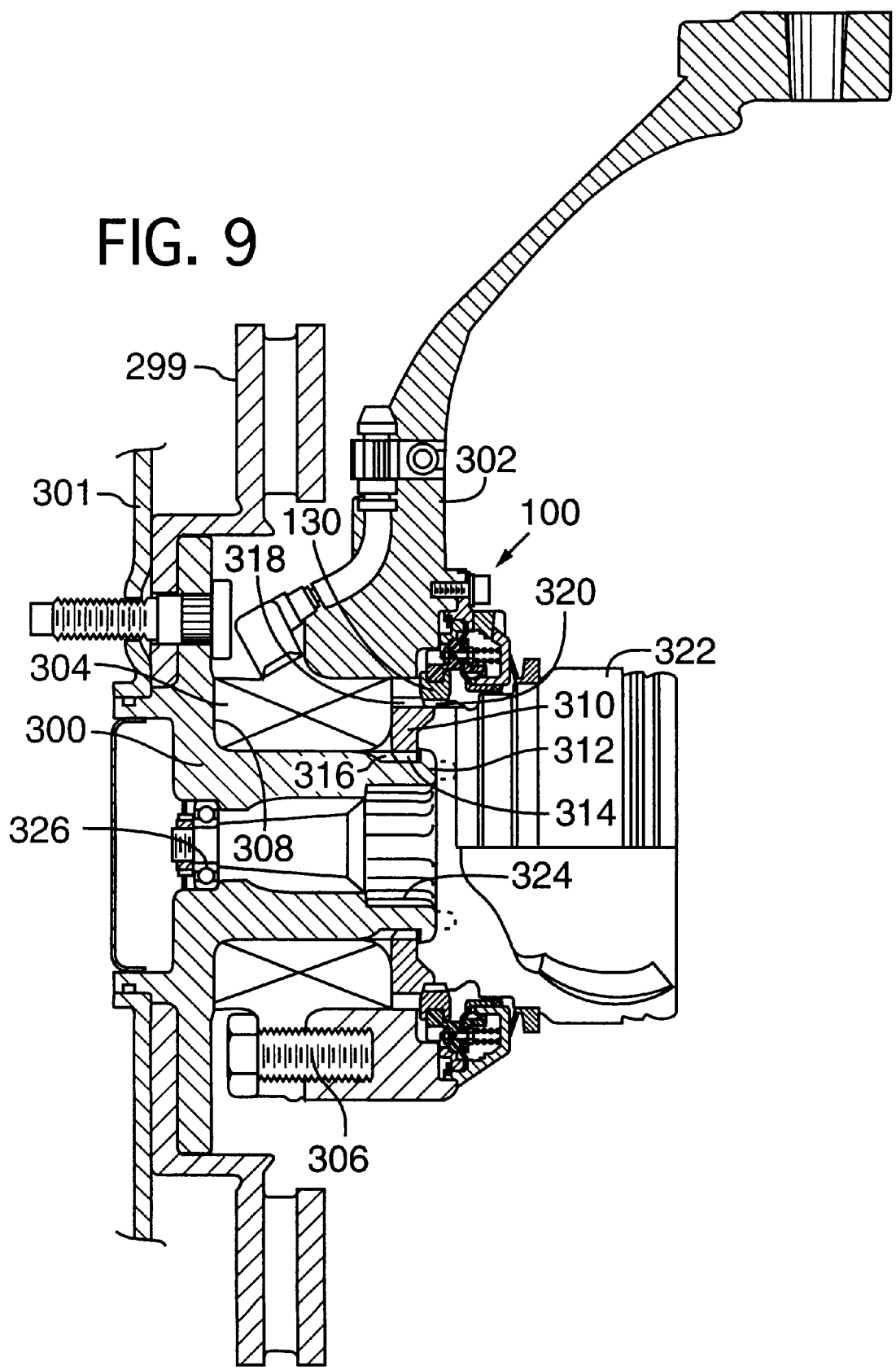
FIGS. 9 and 10 are views illustrating other embodiments of the automatic clutch.
Figure 9A:
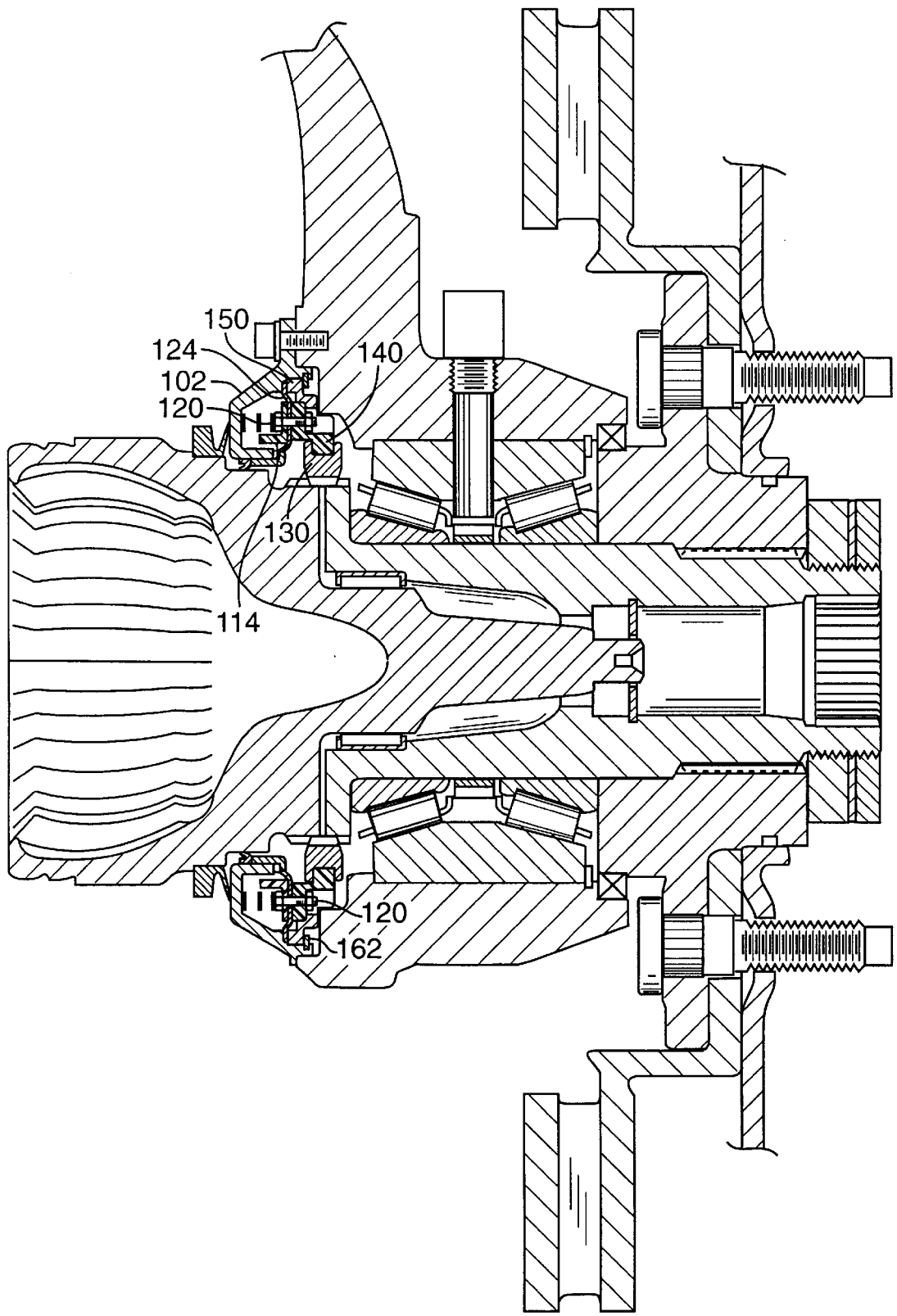

FIG. 9 illustrates another embodiment of the integrated wheel end and automatic clutch. A spindle 300 is rotatably mounted to a knuckle 302 by a bearing pack 304. The bearing pack 304 is secured to the knuckle 302 by fasteners 306 in a conventional manner. The bearing pack 304 is mounted on the spindle 300 and is held captive between a flanged end 308 of the spindle 300 and a coupler 310 mounted on the end of the spindle 300. The coupler 310 has internal splines 314 that are in mesh with external splines 316 on the spindle 300. A roll formed hub 312 retains the bearing pack 304 and the coupler 310 on the spindle 300. A rotor 299 and a wheel 301 are mountable to the spindle 300 in a conventional manner.

A clutch mechanism 100 as previously described is mounted to the knuckle 302. The teeth 133 of the clutch ring 130 are engaged with teeth 320 provided on an axle 322. An end of the axle 322 extends into the spindle 300 and is rotatably supported on bearings 324 and 326.

The clutch ring 130 is movable in one direction by the clutch mechanism 100 to be engaged only with the teeth 320 of the axle 322 and is movable in the other direction to be engaged with both the teeth 320 of the axle 322 and the teeth 318 provided on the periphery of the coupler 310. When the clutch ring 130 is moved in the direction where it only engages the teeth 320 of the axle 322, the spindle 300 (and the wheel 301 mounted thereon) is not coupled to the axle 322. When the clutch ring 130 is moved to be engaged with both the teeth 320 of the axle 322 and the teeth 318 of the coupler, the spindle 300 is coupled to the axle 322 to rotate with the axle 322.

Figure 10:
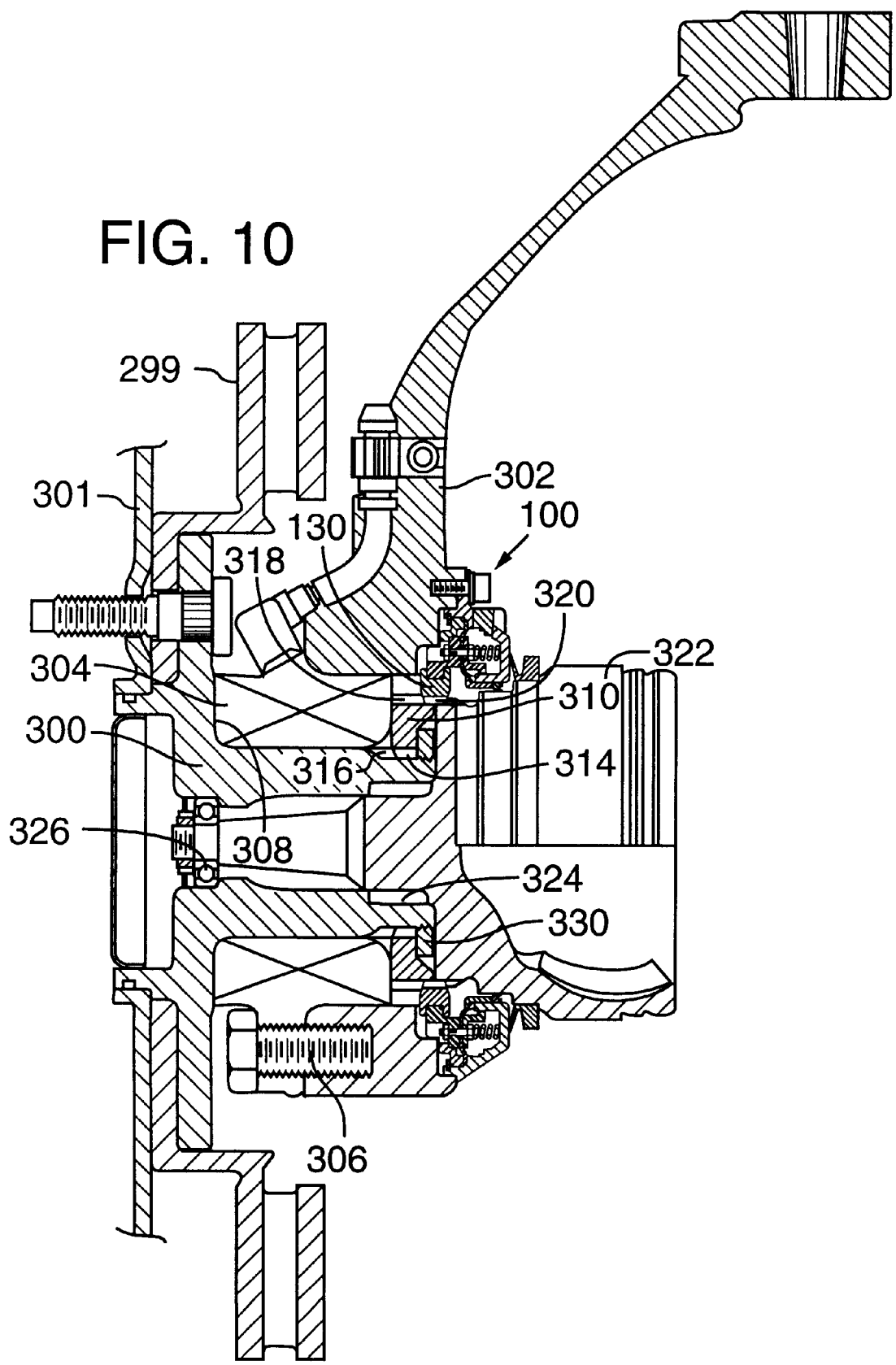

FIG. 10 is similar to FIG. 9 except that a retaining nut 330 threadably installed on the spindle is utilized to retain the coupler 310 and the bearing pack 304 on the spindle 300. The end of the spindle adjacent the splines 316 is threaded in a conventional manner to receive the nut 330.

It will be appreciated that other bearing arrangements not described or illustrated may be provided to rotatably mount the spindle in the configured knuckle. It will be appreciated that the structure of the clutch ring mechanism is not visible from the wheel hub exterior and adds neither weight or wheel end extension relative to the king pin axis. A simple modification to fix the clutch ring to either its engaged or disengaged position (or elimination of the ring altogether) produces either full time four-wheel drive or full time two-wheel drive. Such would allow elimination of the actuator and related components in the case of the two-wheel drive only version, from the entire front wheel (or rear wheel) drive train to reduce cost. The actuator components are not necessary for full-time four-wheel drive since all wheels are engaged at all times with the drive train. The actuator would be replaced by a suitable housing or cover to seal the bearing cavity to prevent entry of foreign material. More importantly, a car manufacturer could produce these various drive train types and avoid any significant design changes.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A vehicle comprising:

a wheel end assembly including a non-rotating member, a spindle having an inner end and an outer end and defining an inner end portion and an outer end portion, said spindle rotatably supported by said non-rotating member at the inner end portion, and a wheel hub fixed to the outer end portion of said spindle;

a drive line including an axle portion, said axle portion rotatably supported by said spindle and not said non-rotating member, said axle portion and said inner end portion of the spindle having adjacent portions each configured to have engaging elements, and a coupler movable between positions of engagement and disengagement relative to said engaging elements for connecting and disconnecting the axle portion and spindle and accordingly the drive line and wheel hub.

2. A vehicle comprising:

a frame, a spindle having an inner end and an outer end and defining an inner end portion and an outer end portion, said spindle rotatably supported by said frame at the inner end portion of said spindle, and a wheel hub fixed to the outer end portion of said spindle;

a drive line including an axle portion, said axle portion and said inner end portion of the spindle having adjacent portions each configured to have engaging elements, and a coupler movable between positions of engagement and disengagement relative to said engaging elements for connecting and disconnecting the axle portion and spindle and accordingly the drive line and wheel hub;

said coupler exposed in part to the exterior of the spindle and axle portion and an actuator mounted to the frame and engaging the coupler for moving the coupler between said positions.

\* \* \* \* \*